United States Patent
Shaffer

(10) Patent No.: US 7,732,687 B2
(45) Date of Patent: *Jun. 8, 2010

(54) STRINGED INSTRUMENT FRETBOARD FOR USE WITH LIGHT-SYSTEM

(75) Inventor: John R. Shaffer, Windham, NH (US)

(73) Assignee: Optek Music Systems, Inc., Reno, NV (US)

(*) Notice: Subject to any disclaimer, the term of this patent is extended or adjusted under 35 U.S.C. 154(b) by 471 days.

This patent is subject to a terminal disclaimer.

(21) Appl. No.: 11/624,006

(22) Filed: Jan. 17, 2007

(65) Prior Publication Data

US 2007/0113720 A1 May 24, 2007

Related U.S. Application Data

(63) Continuation of application No. 11/005,828, filed on Dec. 7, 2004, now Pat. No. 7,173,175.

(60) Provisional application No. 60/528,942, filed on Dec. 11, 2003.

(51) Int. Cl.
*G10D 3/04* (2006.01)
(52) U.S. Cl. .................. 84/314 R; 84/477 R
(58) Field of Classification Search ........... 84/341 R, 84/477 R, 485 R
See application file for complete search history.

(56) References Cited

U.S. PATENT DOCUMENTS

| 3,854,370 A | 12/1974 | Sapinski |
|---|---|---|
| 3,943,815 A | 3/1976 | Gilbert |
| 3,958,113 A | 5/1976 | Termohlen |
| 4,915,005 A | 4/1990 | Shaffer et al. |
| 5,266,735 A | 11/1993 | Shaffer et al. |
| 5,408,914 A | 4/1995 | Breitweiser et al. |
| 6,120,910 A | 9/2000 | Szenics |
| 6,191,348 B1 * | 2/2001 | Johnson ............ 84/485 R |
| 6,337,433 B1 | 1/2002 | Nishimoto |
| 6,452,081 B1 | 9/2002 | Ravagni et al. |
| 6,657,113 B2 | 12/2003 | Herman |
| 6,781,049 B2 | 8/2004 | Taylor |
| 2005/0126365 A1 | 6/2005 | Shaffer |

FOREIGN PATENT DOCUMENTS

| JP | 09 006331 | 1/1997 |
| JP | 09006331 A * | 1/1997 |

\* cited by examiner

*Primary Examiner*—Jianchun Qin
(74) *Attorney, Agent, or Firm*—Finnegan, Henderson, Farabow, Garrett & Dunner, LLP

(57) ABSTRACT

A fingerboard (or fretboard) for use with a stringed instrument and light-system is disclosed and has a bottom surface adapted to mate or be attached to a neck of the instrument, and has wells extending from the bottom surface toward, but not through, a top surface. The wells are sized to receive a light-emitting device, such as LEDs, and are positioned along the fingerboard according to finger positions of the instrument. Illumination from the light-emitting devices is visible to a player of the instrument, however, when the devices are not illuminated, the fingerboard appears substantially as one made without the wells. The structure is useful for learning to play the instrument, while not appearing as a learning device.

28 Claims, 5 Drawing Sheets

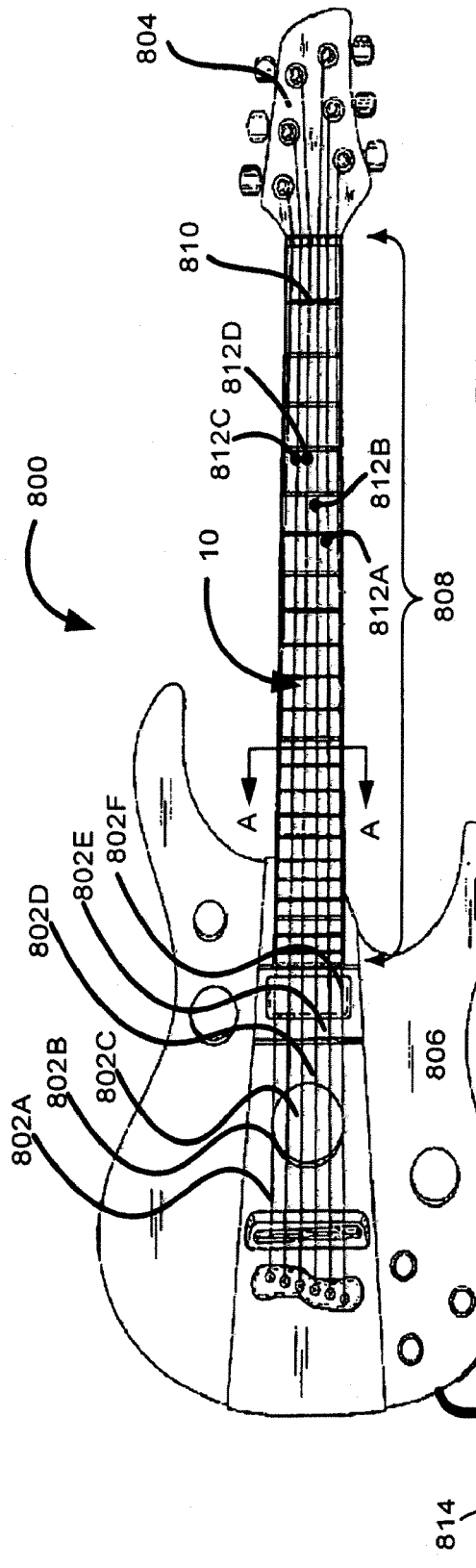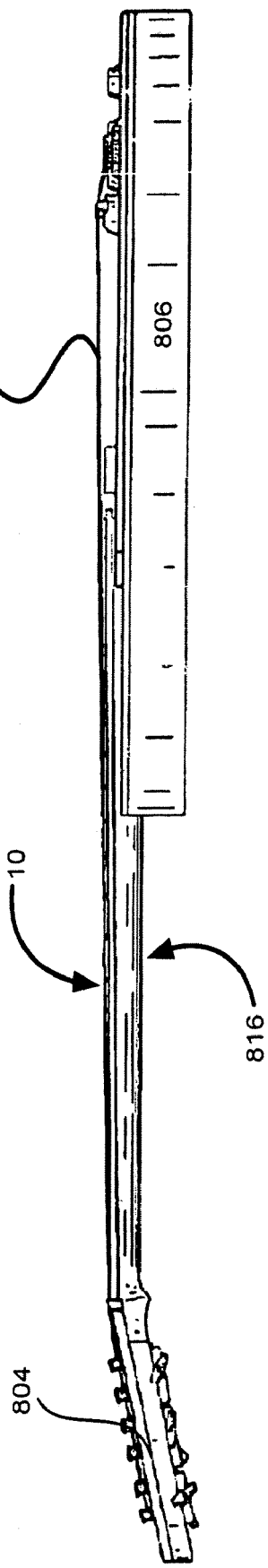

STRINGED INSTRUMENT FRETBOARD FOR USE WITH LIGHT-SYSTEM

RELATED APPLICATIONS

This Application is a continuation of U.S. patent application Ser. No. 11/005,828, filed Dec. 7, 2004, now U.S. Pat. No. 7,173,175 which claims the benefit of U.S. Provisional Application No. 60/528,942, filed Dec. 11, 2003, both of which are hereby incorporated by reference in their entirety.

BACKGROUND

Learning to play any instrument, and particularly stringed instruments such as a guitar, violin, banjo and the like, can be difficult and time consuming. In general, multiple strings must be pressed against a fingerboard or fingerboard at one or more finger positions disposed along a neck of the instrument. At the same time, one or more selected strings must be vibrated via plucking, strumming or bowing, and thus, producing a musical tone, note or chord. Fingerboards are generally used on stringed instruments such as violins and cellos, and do not visually indicate finger positions per se. Conversely, guitars, for example, do have visual indicators—known as frets—and thus use a fretboard. Nonetheless, finger positions must be memorized; one or more strings pressed at those positions against a fretboard (used herein forward interchangeably with "fingerboard"), and selected strings caused to vibrate.

Although mastering stringed instruments can be accomplished through employing instructors and/or utilizing self-teaching books and automated chord charts, among other means, it is time-consuming and arduous. A student generally must translate diagrams from paper or a computer screen to locations of finger positions along the fingerboard. Next, the student must determine which strings to vibrate. Further, because a single note or cord can be played using one of several different finger positions and/or strings, the student must then determine which of those positions is most beneficial in a sequence of notes or chords according to a song or tune.

Some attempts have been made to facilitate the learning process. One attempt has been to provide a fingering display apparatus that has one or more holes bored through a fretboard through which illuminated lights are visible. But the bores were difficult to create, and often damaged or negatively impacted the strength of the neck, as well as its tonal qualities. The neck of the instrument could flex creating the need for frequent adjustments. Further, the bores required a cover or cap causing visible indications that the instrument had been altered. Thus, is was apparent that the instrument was a "learning" instrument, much like training wheels that could not be removed from a bicycle.

Another attempt incorporated a "stick" on display having small lights. Much like the attempt described above, the lights could illuminate according to certain finger positions. But the display caused difficulties as it affected the tactile feel of the fingerboard, could slip in position, and was difficult to place on a neck of the instrument.

With those and other drawbacks in mind, it is apparent that while the light-system sub-displays are useful, there are no means to inexpensively employ them, no means to preserve the integrity of the instrument, and no means to hide the system from observers.

Thus, there is a need to provide a fingerboard for an instrument that can provide a learning tool, and also be inexpensive and substantially non-detectable, and be able to utilize a light-system with a sub-display along the fingerboard. Further, there is a need to provide such a fingerboard that does not negatively affect the integrity of the instrument, and provides a tactile feel substantially as that of an instrument using a non-modified fingerboard.

SUMMARY OF THE INVENTION

The above and other objects are obtained by the invention which provides a fingerboard for a stringed instrument that can be used for a learning tool to assist a player in learning to play the instrument. Such a fingerboard, according to one aspect of the invention, is an elongated structure, generally of a size and shape to be mounted or coupled to a neck portion of the instrument. Wells corresponding to finger positions or other positions are disposed within the fingerboard, and extend from openings in a bottom surface toward—but not through—a top surface. Light-emitting devices of the light-system can be disposed within the wells, and are visible from the top surface when illuminated, e.g., visible to a player of the instrument, each designating a finger position or other position. Advantageously, the fingerboard can provide a concealed teaching tool for players of the instrument, inasmuch as when the illuminating devices are not illuminated, the fingerboard can appear as one that does not have the wells and devices therein.

In a related aspect, the fingerboard can be constructed of a single piece structure manufactured of a polymer, e.g., a polycarbonate material, using injection-molding techniques. Alternatively or together with injection molding, wells can be molded or bored from the bottom surface toward, but not through, the top surface wherein light-emitting devices of the light-system can be wholly or partially disposed and their light is visible from the top surface when illuminated. The fingerboard is generally dark in color and translucent in light transmission, however, it can be virtually any color and transparency depending on the design of the instrument for which it will be used. It can have areas of transparency and areas of opaqueness or translucence depending, for example.

In another aspect of the invention, a neck of a stringed instrument is provided having a fingerboard of the type generally described above mounted or otherwise attached to an upper surface of an elongated portion of the neck. The neck has a head end for securing one or more strings of the instrument, and a body end adapted to mate with a body of the instrument. The neck can be constructed of wood, fiberglass, metal or other materials depending on the construction of the instrument.

In a further aspect, the invention provides an improved neck for a stringed instrument by reinforcing the neck. A fingerboard can be manufactured using polymer material that has a substantial stiffness. The fingerboard can be permanently attached or coupled to the neck portion. Because the polymer material is substantially stiff, the flexing of the neck is reduced providing for less frequent adjustments.

BRIEF DESCRIPTION OF THE DRAWINGS

Additional benefits and advantages of the present invention will become apparent to those skilled in the art to which this invention relates from the subsequent description of preferred embodiments and the appended claims, taken in conjunction with accompanying drawings, in which:

FIG. 8 is a guitar with the fingerboard of FIG. 1 mounted or otherwise attached to a neck of the guitar, together with a light-system circuit board with light-emitting devices that can illuminate certain finger positions along the fingerboard; and FIG. 9 is a side view of the guitar of FIG. 8.

DETAILED DESCRIPTION OF THE INVENTION

The present invention provides a fingerboard (or fretboard as will be described below) for a stringed instrument and is suitable for use with a light-system that can designate certain finger position by illuminating those positions along the fingerboard corresponding to musical notes and/or chords. The fingerboard is an elongated structure, generally of a size and shape to be mounted or attached to a neck portion of the instrument. Wells corresponding to, or otherwise designating, the finger positions or other positions are disposed within the fingerboard, and extend from openings in a bottom surface toward—but not through—a top surface. Light-emitting devices of the light-system can be disposed within the wells, and are visible from the top surface when illuminated, e.g., visible to a player of the instrument. The fingerboard can be a single-piece, opaque polycarbonate structure, manufactured using injection-molding methods.

Advantageously, the fingerboard can provide a concealed teaching tool for players of the instrument, inasmuch as when the illuminating devices are not illuminated, the fingerboard can appear as one that does not have wells and devices therein. Further, the fingerboard provided herein can enhance the tonal quality of the instrument, and can improve the structural integrity of the neck portion.

Figure 1:
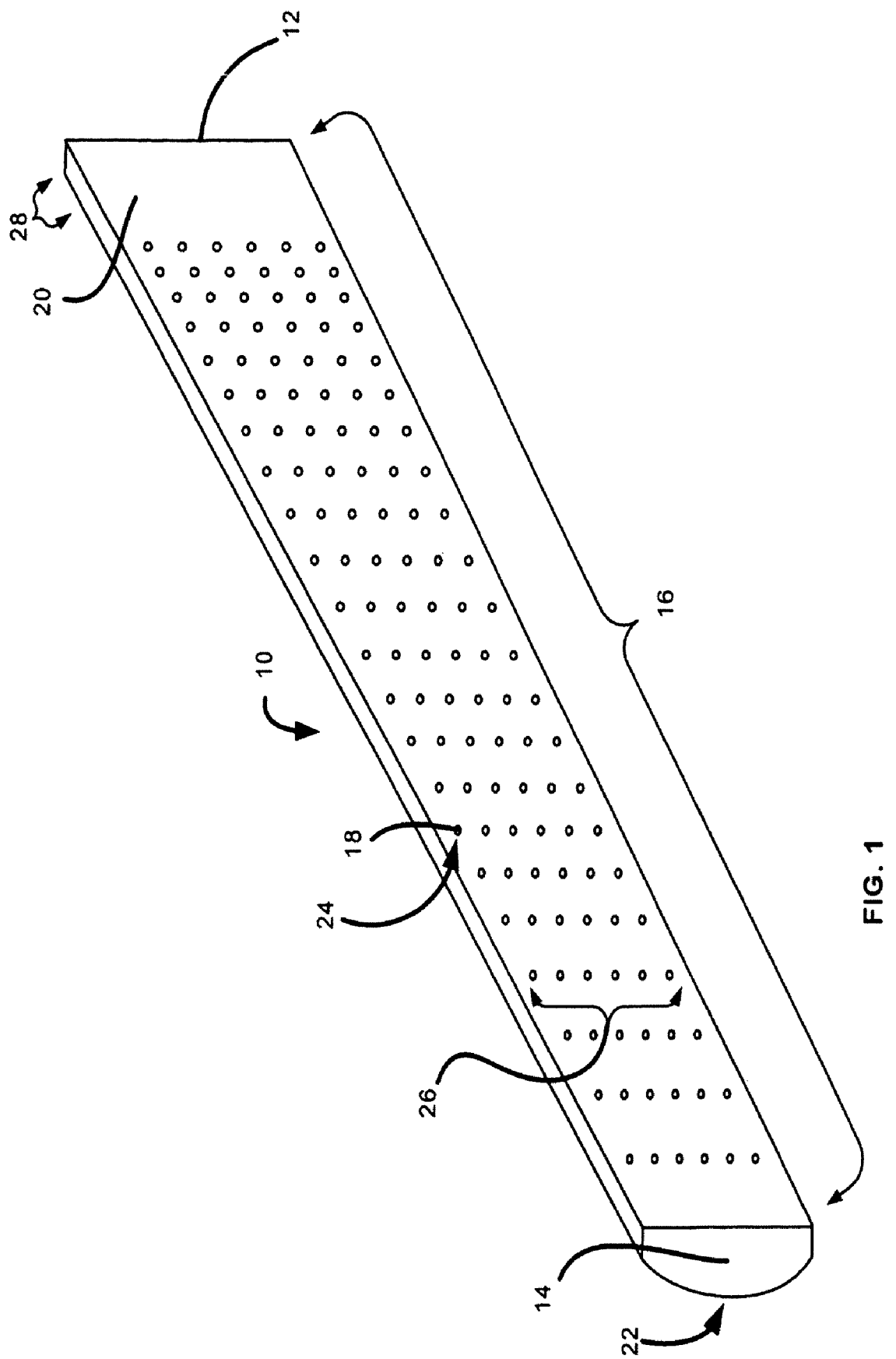
FIG. 1 is an embodiment of a fingerboard according to the invention and illustrates the structure with a plurality of wells, each extending from a bottom surface toward, but not through, a top surface.

FIG. 1 shows one embodiment of a fingerboard 10 that can be used with a light-system for illuminating finger positions corresponding to notes and/or chords of a stringed instrument. Fingerboard 10 is a generally elongated structure having a distal end 12 and a proximal end 14, and an elongated body 16 therebetween. A top surface 22 is generally smooth and is sufficiently hard to allow a player to press one or more strings at corresponding finger positions against it while playing the instrument. Bottom surface 20 is generally smooth and flat, and can couple with, or be adapted to receive, a circuit board of a light-system, for example, and be attached or coupled with a neck of the instrument. Openings 24 are disposed along bottom surface 20, and can have a respective well 18 that extends therefrom toward—but not through—top surface 22. The wells are sized to each receive a light-emitting device (e.g., LED) of the light-system, and has a height measured from the bottom surface 20 sufficiently large to allow light from the light-emitting device to be visible from top surface 22.

Top surface 22 as illustrated is generally convex in shape, but in other embodiments it can be flat, triangular, rounded, or indeed, can have complex shapes comprising shape-components of one or all of those basic shapes. But preferably, top surface provides a surface upon which strings of the instrument can be pressed in the normal course of playing the instrument, and that allows the player to easily move between finger positions. Top surface 22 is generally sanded or otherwise smooth, and can have decorations, inlays or other insignia thereon or therein. It is sufficiently hard to allow the strings of the instrument to be pressed there against in the normal course of playing that instrument.

In one embodiment, top surface 22 can adapted to provide or receive frets, such as fret bars, although frets can also be visually indicated through use of inlays, printing or insignia, or decorative designs. Frets can be of differing material that than of fingerboard 10, and can be a raised structure running the transverse of fingerboard 10. Top surface 22 can have grooves or fret-slots to receive the frets, or can be otherwise adapted to receive frets having nut-assemblies for securing them to the fingerboard 10. Frets may be adhered directly on top surface of fingerboard 10 when fret-slots are not present.

Markings such as fret-lines, decorations or other insignia can be engraved, printed or otherwise disposed on or in top surface. For example, commonly used decorations made of pearl inserts can be disposed therein. But preferably, such frets, decorations or insignia should not obscure light emanating from the illumination devices disposed within the wells 18. Advantageously, so-called fret-migration where shrinkage of a fingerboard causes frets to extend beyond its edges can be minimized or prevented by selecting materials having coefficients of expansion of both the fingerboard and frets can be approximately matched. Use of polymer materials for manufacturing the fingerboard can assist in accomplishing this task.

Thus, those skilled in the art will appreciate that fingerboard 10 is suitable for instruments that are "fret-less" such as a violin, and is also suitable for instrument that have frets, such as guitar, and that use of the terms "fretboard" and "fingerboard" are encompassed within the invention, although use of those examples are non-limiting except that a fretboard generally has frets and a fingerboard generally is fretless, although the terms may be used interchangeably herein.

Top surface 22 should be sufficiently smooth to allow a player to quickly and easily slide a hand along the top surface 22 and neck of the instrument to a next finger position, and is sufficiently hard to allow the player to press one or more strings against it while playing the instrument. Preferably, fingerboard 10 has a top surface 22 that is at least suggestive of, and more preferably quite similar to, the color, shape and size of one that would be commonly used on the intended instrument. It is envisioned, however, that some players may desire unusually colored, shaped and/or sized fingerboards, and those can be easily accommodated by the invention.

Bottom surface 20 is generally flat and smooth, and is adapted to receive or otherwise couple with both a circuit board of the light-system (where the light-system used does indeed utilize a circuit-board) and to be mounted on, or attached to, the neck of the instrument, and this is discussed in detail below. But preferably, bottom surface 20 is disposed on or attached to an upper surface of a neck base of the instrument, and is thereon glued, screwed, bolted or otherwise attached, either permanently or releasably.

Openings 24 are disposed on or along bottom surface 20, and are generally positioned beneath finger positions or other positions on the top surface 22. Openings 24 can be organized into rows 26 that correspond to a fret position such as a fret bar, where a fret position has multiple finger positions all at the same transverse position along the top surface 22. For example, row 26 corresponds to what will be appreciated by those skilled in the art as fret position number four, and such identification is common within the art. Thus, a row 26 will generally have the same number of openings as the instrument has number of strings, e.g., a six-string guitar will have rows of six openings.

A well 18 extends from a respective opening 24 in a direction toward the top surface 22—but does not extend through top surface 22. Preferably, each opening 24 has a respective well 18, and each well corresponds to a finger position, although there can be other positions that have a corresponding well, e.g., a bridge location 28 located near the distal end 12 when the instrument and/or fingerboard 10 has such a bridge. One skilled in the art will appreciate that because wells do not extend through the top surface, caps or well-covers are not required and top surface will appear as one unaltered, that is, a viewer of the instrument cannot easily detect the light-system embedded therein.

Figure 2:
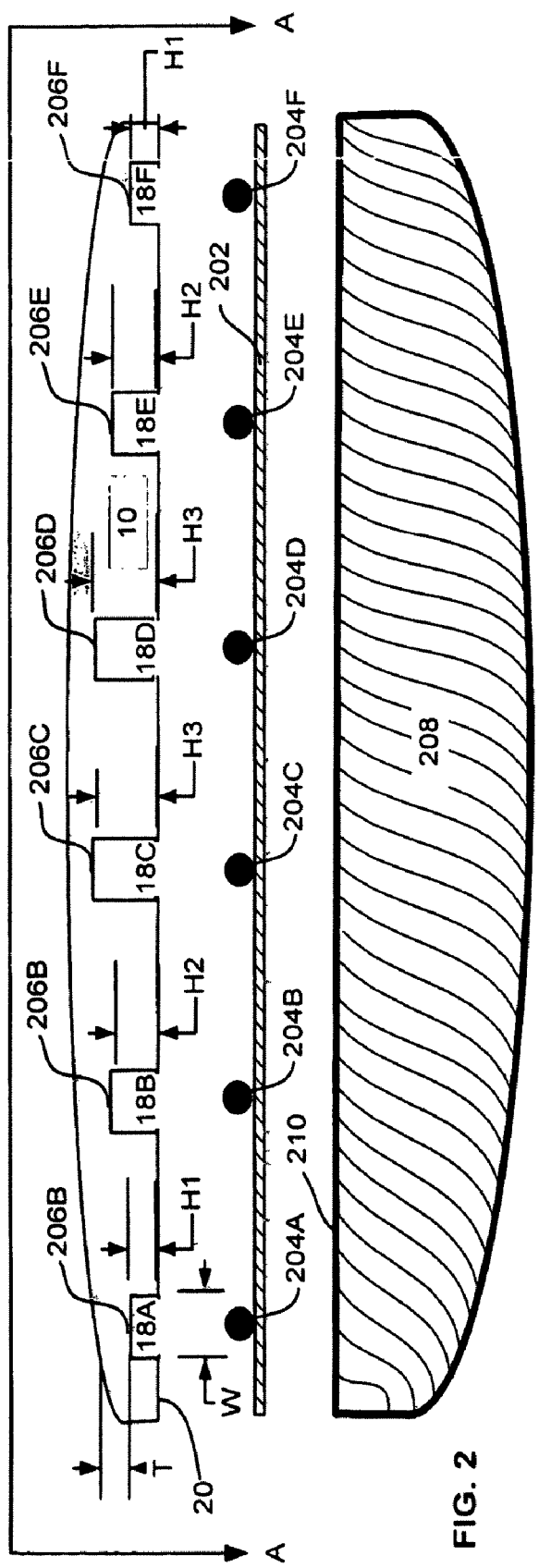
FIG. 2 is a cross-sectional exploded view along a neck on an instrument showing the fingerboard, circuit board and neck base.

FIG. 2 is a cross-sectional exploded view of fingerboard 10 across a transverse axis A (FIG. 8), and also shows a circuit board 202 having light-emitting devices 204 and a neck base 208 of an instrument. Illustrated is a row of openings having wells 18 extending from the bottom surface 20 toward—but not through—the top surface 22. Top surface 22 is of a convex shape, and this is advantageous for certain instruments. To conform with the convex top surface 22, wells 18 have differing heights H1-H6 depending on the transverse location of its respective opening, and this can account for varying thickness of fingerboard 10 with respect to its top surface 22. Preferably, each well has a height such that a thickness T of material between a well-top 206 and the top surface 22 is approximately constant, and this allows all illuminating light-emitting devices to have the same intensity when viewed from the top surface.

Thus, as shown, well 18A has a height H1, leaving a material thickness T between well-top 206A and the top surface 22. It will be appreciated by one skilled in the art that because fingerboard 10 has transverse symmetry, well 18F also has a height H1. Further, well 18B and well 18E each have a height H2, and because of the convex shape of fingerboard 10, each well 18B 18E has a well-top 206B 206E, respectively, that leaves a thickness T of material. Finally, in this non-limiting example, wells 18C 18D each have a height H3, thus leaving a thickness T of material between well-tops 206C 206D, respectively.

As will be appreciated by one skilled in the art, the height of each well should be sufficiently large to allow an illuminated light-emitting device disposed within the well to be visible when viewed from the top surface 22 of the fingerboard. On the other hand, the thickness therebetween should be sufficiently large to provide a hard surface against which a string may be pressed during the normal course of playing the instrument. Thus, it is preferable that the thickness be in the range of about 0.01 inch and 0.4 inch, and more preferably in the range of about 0.05 inch and 0.1 inch.

Wells 18 are sized to receive light-emitting devices 204 disposed on or connected to circuit board 202 that is a component a light-system. Each light-emitting device 204 correlates in position to a well 18 such that when circuit board 202 is coupled to the bottom surface 20 of fingerboard 10, each light-emitting device 204 is received by a well 18. In one embodiment, a light-system may not utilize a circuit board, per se, and electrical lands or connectors, as well as decoders and other electronic devices may be manufactured integral with fingerboard 10. For example, conducting electrical lands can be transferred, etched or otherwise disposed on bottom surface 20 or through fingerboard 10, as well as connectors or electrical components. In those embodiments, bottom surface 20 can mate direct to neck base 208, rather than as in the illustrated embodiment where bottom surface 20 is adapted to mate or couple with neck base 208 with circuit board 202 disposed or sandwiched therebetween.

One example of such a light-system for use herewith is described in U.S. Pat. No. 4,915,005, filed Aug. 25, 1998 by John R. Shaffer, et al., "Fingering Display for Musical Instrument," and is incorporated herein by reference in its entirety. Another example is described in U.S. Pat. No. 5,266,735, filed Dec. 2, 1992 by John R. Shaffer, et al., "Music Training Instrument and Method," and is also incorporated herein by reference in its entirety.

Figure 3:
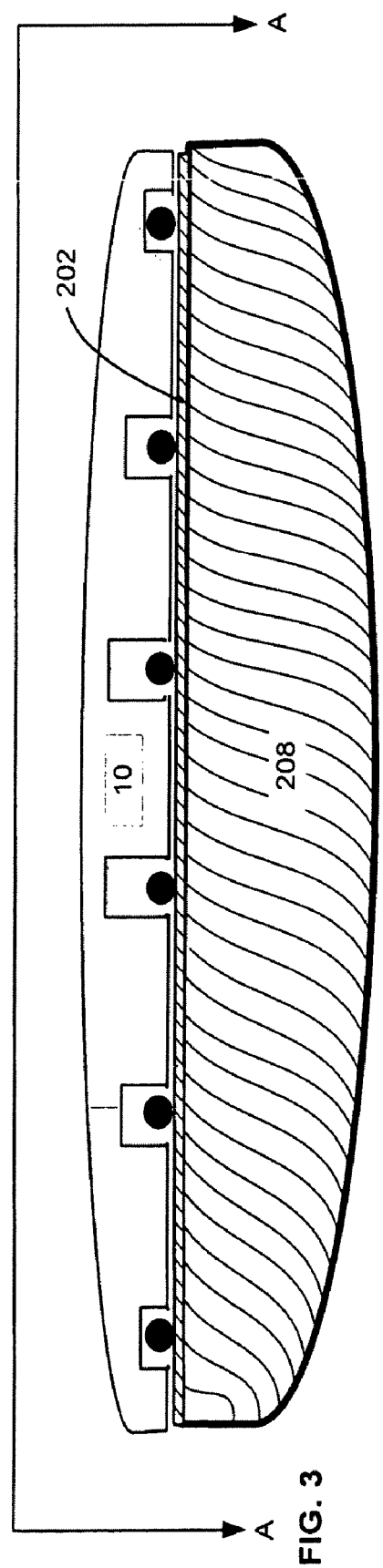
FIG. 3 is the cross-sectional view of FIG. 2 in an assembled position.

FIG. 3 shows the elements of FIG. 2 in an assembled position. Illustrated is the fingerboard 10 having wells 18, each with a light-emitting device 202 disposed therein. Fingerboard 10 is coupled or glued to circuit board 202, which is in turn, coupled or glued to neck 208. As can be seen, the thickness of material between each well-top 206 is approximately equal.

It will be appreciated by those skilled in the art that fingerboard 10, circuit board 202 and neck base 208 can be assembled using a variety of techniques. For example, adhesives or glues can be used for permanent bonding. In embodiments where disassembly may be desired, other techniques such as screws, nut assemblies, snap fittings and other releasable methods can be used. In any event, fingerboard 10 should be held securely to neck base 208 in order to avoid movement between the two, as such movement could degrade the usability of the instrument. In other embodiments where circuitry of the light-system is integral with fingerboard 10, a non-conductive layer may be placed between fingerboard 10 and neck base 208 to prevent wear due to normal contractions between fingerboard 10 and neck 208, especially when they are of differing materials.

As a note, it is advantageous to manufacture fingerboard 10 slightly wider than the width of neck base 208. Then, after assembly, the side edges can be ground, sanded, or otherwise shaped to produce smooth adjoining edges and remove any excess glue or adhesive when attachment such methods are used.

Figure 4:
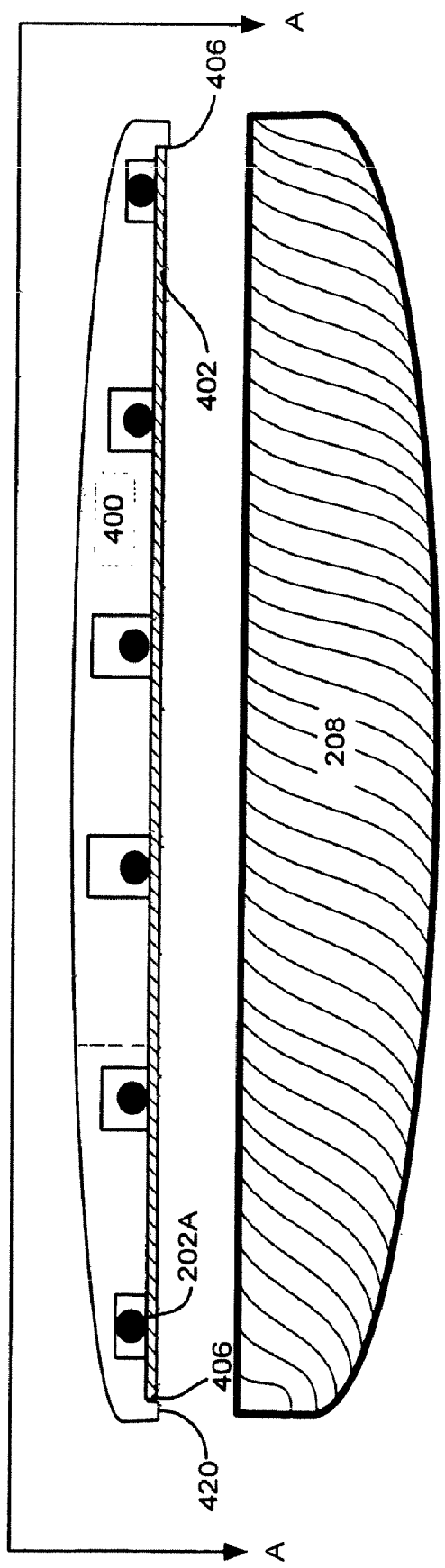
FIG. 4 is a cross sectional view of a fingerboard according to the invention having a chamfered bottom surface adapted to receive a circuit board of a light-system.

FIG. 4 shows an embodiment of a fingerboard 400 that is generally as described above, however, fingerboard 400 has a bottom surface 420 having a chamfered or otherwise recessed area 406 sized to receive a circuit board 402 that has light-emitting devices 404 thereon. Circuit board 402 is sized to fit within the recessed area 406, as will be appreciated by those skilled in the art. Advantageously, fingerboard 400 when assembled to neck base 208 can further conceal circuit board 402 when viewing the neck base 208 from a side angle. For example, the assembly will not have what might appear as a laminated portion between it and the neck base 208 when assembled.

Figure 5:
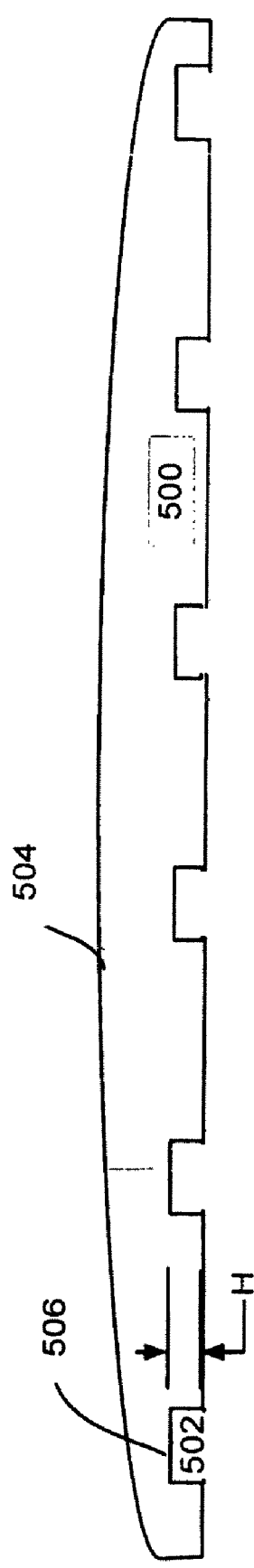
FIG. 5 is a fingerboard according to the invention having wells of equal heights.
Figure 6:
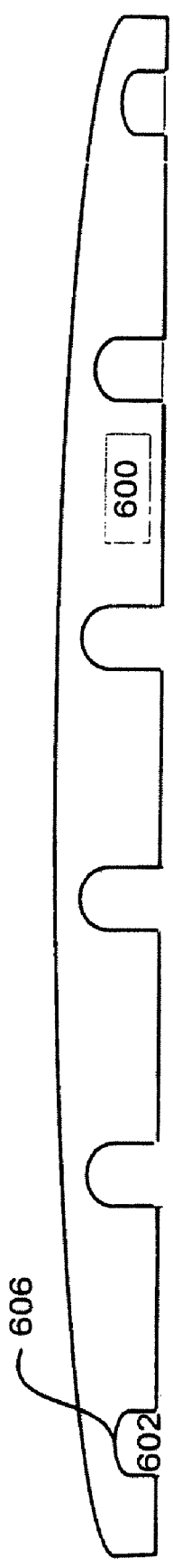
FIG. 6 is a fingerboard according to the invention having wells of varying heights and round well tops.
Figure 7:
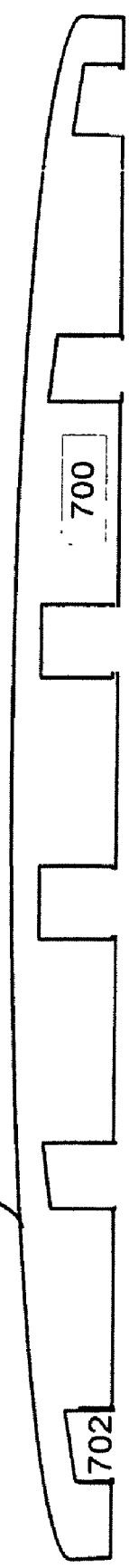
FIG. 7 is a fingerboard according to the invention having well of varying heights and slanted well tops.

Further embodiments of fingerboards according to the invention are shown in FIGS. 5-7. One skilled in the art will appreciate that these embodiments are non-limiting examples illustrated herein for further understanding; other embodiments are envisioned and alterations and/or modifications are encompassed within the invention.

FIG. 5 illustrates a fingerboard 500 according to the invention having, in general, the features as described above albeit, the height H of the wells 502 are constant rather than varied according to a thickness of the fingerboard. Thus, the thickness of fingerboard material between a top surface 504 and a well top 506 varies from well to well. Advantageously, fingerboard 500 can, in some instances, simplify manufacturing of the fingerboard. However, consideration should be given to a maximum thickness T because it is advantageous for a player of a stringed instrument to be able to observe each light-emitting device and if the thickness becomes too great, such may become difficult. Nonetheless, in embodiments where the thickness of a fingerboard varies only slightly and the difference in illumination visible to a player of the instrument may be slight when using wells of constant height, the reduced cost of manufacturing may outweigh the detriment.

FIG. 6 illustrates a fingerboard 600 according to the invention having, in general, the features described above with wells, e.g., 602 having rounded or convex tops 606. Although the well tops 606 can have a variety of shapes, advantageously, a rounded top can provide an interior surface that conforms with an outside geometry of a light-emitting device disposed within the well 602, and can be used to secure or otherwise prevent movement of the device within the well 602. Further, in some manufacturing processes where wells are drilled after a fingerboard structured is molded or otherwise manufactured, drilling techniques utilizing rounded, flat, or triangular shaped drill-bit can be used, and this will be appreciated by one skilled in the art. Further, although not illustrated, well 602 can have the same height, as shown in FIG. 5.

FIG. 7, illustrates a fingerboard 700 having wells 702 with slanted or angled well tops 704, that angle generally tangential to top surface 704, although the remaining features of the fingerboard are as generally described above.

Thus, as can be seen, various well shapes and sizes, and/or various well top geometries, can be utilized as long as the wells are shaped and sized as to receive light-emitting devices, light from an illuminated device within a well is visible to a player of the instrument, and there is sufficient structural integrity between the well-top and the top surface of the fingerboard to press a string against it in the normal course of playing the instrument.

It will be appreciated by one skilled in the art that although the fingerboards described above can generally appear as normally produced ones, e.g., those without a light-system, they can also be constructed to provide an altered-appearance. For instrument players who desire, for example, to conceal the light-system, a fingerboard can be made of a translucent material so as to substantially hide detection of non-illuminated devices disposed within the wells. Polycarbonate materials are well suited for those fingerboards because it can undergo injection molding and can be colored or tinted to appear like an ordinary fingerboard.

Conversely, for players who desire a "high-tech" electronic appearance, such as visible blinking lights or exposed circuitry, for example, the fingerboard can be clear or slightly tinted. Further, the fingerboard can have areas of clarity and areas of translucence or opaqueness. Thus, for example, the fingerboard may be transparent when viewed from the top surface, and opaque when viewed from side to side. It will be appreciated, then, that fingerboard can have a variety of designs, clarity, opaqueness and/or translucence depending on its intended design and appearance.

Therefore, Plexiglas®, plastics and other polymer materials can be used because such materials are suitable for injection molding manufacturing processes and can be clear and/or tinted, opaque and/or translucent. Of course, other materials can be used, and those materials will be appreciated by those skilled in the art. Indeed, the materials used can provide areas of transparency and areas of opaqueness and/or translucence simultaneously depending on a design and look desired.

Further, boring of the openings and wells can be performed with or after manufacturing of the structure using techniques that will be known to those skilled in the art, e.g., drill press assemblies, templates or others. As noted above, fret-slots can be cut, or can be integrated into an injection molding process, as can any insignias or designs.

Advantageously, use of such fingerboards as provided herein can strengthen the neck portion of the instrument. Thus, previous design restraints related to neck bending and flexing are reduced and periodic adjustments to the neck can be reduced or indeed, even eliminated. For example, internal reinforcement of the neck portion can be reduced or eliminated without increasing the frequency of neck adjustments. Further, it has been found that the fingerboards provided herein can enhance tonal qualities of the instrument.

Thus, methods for improving a neck of a string instrument can be accomplished by manufacturing a fingerboard and permanently attaching it to an upper surface of a neck. The fingerboard can be a single-piece polymer material that is injection molded using a mold that can provide a plurality of wells extending from a bottom surface of the fingerboard toward, but not through, a top surface. Each well is sized to receive a light-emitting device of a light system. Preferably, the fingerboard is manufactured of a polycarbonate material that can provide substantial stiffness to the neck when attached thereto.

FIGS. 8 and 9 show a non-limiting example of fingerboard 10 (FIG. 1) in practice, here, as part of a guitar 800, an instrument generally having frets 810, and six or more strings 802. By way of background, strings 802 are tensioned between a head 804 and a body 806 and extend along a neck 808 or portion thereof (or extending therefrom) such that each string produces a different note when vibrated. Pressing one or more strings 802 against the top surface of the fingerboard 10 at various finger positions, and then strumming or plucking one or more strings, produces a musical note or chord.

A light-system having light-emitting devices, such as those disclosed in the above referenced patents incorporated herein, has the ability to energize or illuminate certain of those light-emitting devices according to a desired note or chord. Thus as illustrated, certain light-emitting devices are illuminated 812 and their light is visible to a player of the guitar, such that a player would press strings designated by each of those illuminated devices 812 against fingerboard 10. As illustrated, string 802B would be pressed at finger position 812C; string 802C would be pressed at finger position 812C; string 802C would be pressed at finger position 812B; and string 802D would be pressed at finger position 812A.

Connector 814 is used to couple the circuit board of light-system to a controller, in embodiments with an external light system such as a PC, portable device or other electronic system. Of course, light systems can also couple using wireless technologies such as 801.11a, 801.11.g, so-called bluetooth and others, and the fingerboard can be adapted to receive circuit boards containing those, and others. Various protocols can be utilized to provide communication between the light-emitting devices and a digital processor or computer system.

FIG. 9 is a side view of the guitar 800 of FIG. 8, and shows fingerboard 10 disposed on neck base 808.

Illustrative embodiments of the invention being thus described, variations, modifications and adaptations to various fingerboard, fingerboard and other similar structures and devices will occur to those skilled in the art, and these are considered to be within the scope of the invention. Accordingly, the invention is not to be limited by what has been particularly shown and described, but is understood to encompass such variations, modifications and adaptations as will occur to those skilled in the art, as defined by the claims appended hereto and equivalents thereof.

What is claimed is:

1. A stringed instrument comprising:
   a wooden neck having an upper and lower surface;
   a body; and
   a fretboard having a top surface and a bottom surface, the bottom surface having a size and shape corresponding to at least a portion of the neck, wherein at least a portion of the fretboard is formed of a translucent material, the fretboard further comprising at least one opening in the bottom surface and at least one well extending therefrom toward, but not through, the top surface, the well having a height measured from the bottom surface to allow light from a concealed light-emitting device positioned substantially within the well to be visible to a player of the instrument when illuminated and to substantially hide visual detection of the concealed light-emitting device when not illuminated, and wherein the top surface of the fretboard has a convex shape and the fretboard further comprises multiple wells generally positioned along a transverse axis and having differing heights, and wherein the thickness of fretboard material between each well top and the convex top surface is generally constant.

2. The instrument of claim 1, further comprising a plurality of frets disposed along the top surface of the fretboard.

3. The instrument of claim 2, further comprising grooves disposed along the top surface of the fretboard, each groove adapted to receive a fret.

4. The instrument of claim 1, further comprising a circuit board, the circuit board having a plurality of light-emitting devices.

5. The instrument of claim 4, wherein the plurality of light-emitting devices disposed on the circuit board are received by corresponding wells.

6. The instrument of claim 4, wherein the bottom surface of the fingerboard is attached to the circuit board.

7. The instrument of claim 4, further comprising a recessed area disposed on the bottom surface of the fretboard, the recessed area sized to receive the circuit board.

8. The instrument of claim 1, wherein a thickness of material between a top of the well and the top surface of the fretboard is between approximately 0.01 inch and approximately 0.4 inch.

9. The instrument of claim 1, wherein a thickness of material between a top of the well and the top surface of the fretboard is between approximately 0.05 and approximately 0.1 inch.

10. The device of claim 1, further comprising frets spaced at intervals along the length of the fretboard.

11. The device of claim 10, wherein the wells and the light emitting devices indicate finger positions within the interval.

12. The instrument of claim 1, wherein the light illuminating from the top surface of the fretboard is substantially circular.

13. The instrument of claim 1, wherein the at least one well has a substantially circular cross-section along a plane parallel to the top surface of the fretboard.

14. A neck assembly for a stringed instrument comprising:
    an elongated neck having a head end and a body end, and comprising wood, the body end adapted to mate with a body of a stringed instrument;
    an elongated fingerboard structure comprising a translucent polymer and having a top surface and a bottom surface, the bottom surface sized to be disposed on the neck, and wherein the top surface has a convex shape and the elongated fingerboard structure further comprises multiple wells generally positioned alone a transverse axis and having differing heights, and wherein the thickness of the translucent polymer between each well top and the convex top surface is generally constant; and
    multiple concealed light emitting devices positioned substantially between the neck and the fingerboard structure for indicating finger positions, wherein the concealed light-emitting devices are substantially hidden when not illuminated.

15. The neck assembly of claim 14, further comprising a circuit board disposed between the neck structure and the fingerboard structure, the circuit board having a plurality of light-emitting devices disposed thereon.

16. The neck assembly of claim 15, wherein each light-emitting device corresponds to a well on the bottom surface of the fingerboard.

17. The neck assembly of claim 16, wherein the well has a substantially circular cross-section along a plane parallel to the top surface of the fingerboard structure.

18. The neck assembly of claim 15, wherein the fingerboard further comprises a recessed area along the bottom surface sized to receive the circuit board.

19. The neck assembly of claim 14, further comprising a plurality of frets disposed along the top surface, each fret designating one or more finger positions.

20. The neck assembly of claim 14, wherein at least a portion of the fingerboard is composed of a translucent material.

21. The neck assembly of claim 14, wherein a thickness of material between a top of the well and the top surface is between approximately 0.01 inch and approximately 0.4 inch.

22. The neck assembly of claim 14, wherein a thickness of material between a top of the well and the top surface is between approximately 0.05 and approximately 0.1 inch.

23. The neck assembly of claim 14, further comprising frets spaced at intervals along the length of the fretboard.

24. The neck assembly of claim 23, wherein the finger positions indicated by the light emitting devices are positioned within the intervals at a location adjacent to the frets.

25. The neck assembly of claim 23, wherein the frets comprise multiple, individual pieces.

26. The neck assembly of claim 14, wherein the fingerboard having wells comprises a single piece structure.

27. The neck assembly of claim 14, wherein a light associated with at least one of the multiple concealed light-emitting devices illuminates from the top surface of the fingerboard structure with a substantially circular cross-section.

28. The neck assembly of claim 14, wherein the concealed light-emitting devices are positioned between the neck and the fingerboard structure to provide generally uniform illumination intensity when viewed from the top surface of the fingerboard structure.

* * * * *

UNITED STATES PATENT AND TRADEMARK OFFICE
CERTIFICATE OF CORRECTION

PATENT NO. : 7,732,687 B2
APPLICATION NO. : 11/624006
DATED : June 8, 2010
INVENTOR(S) : John R. Shaffer Page 1 of 1

It is certified that error appears in the above-identified patent and that said Letters Patent is hereby corrected as shown below:

Claim 14, col. 10, line 6, "alone" should read -- along --.

Signed and Sealed this

Thirty-first Day of August, 2010

David J. Kappos
*Director of the United States Patent and Trademark Office*